United States Patent [19]

Cwik

[11] Patent Number: 4,459,920

[45] Date of Patent: Jul. 17, 1984

[54] DUAL PURPOSE BRACKET

[75] Inventor: Norbert L. Cwik, Northfield, Ill.

[73] Assignee: Quaker Industries, Inc., Antioch, Ill.

[21] Appl. No.: 289,218

[22] Filed: Aug. 3, 1981

[51] Int. Cl.³ ............... A47B 47/02; A47B 91/00; B60B 33/00

[52] U.S. Cl. .............................. 108/107; 16/29; 108/50; 248/188.8

[58] Field of Search .................. 108/107, 111, 50; 16/29, 31 R; 248/188.8

[56] References Cited

U.S. PATENT DOCUMENTS

| Re. 16,133 | 8/1925 | Smithfield . | |
|---|---|---|---|
| 102,253 | 4/1870 | Grosse . | |
| 331,211 | 11/1885 | Osborn et al. . | |
| 427,662 | 5/1890 | Blandon et al. . | |
| 742,770 | 10/1903 | Wheeler et al. . | |
| 962,461 | 6/1910 | Penney | 16/29 |
| 1,442,097 | 1/1923 | Rowntree | 16/29 |
| 1,445,395 | 2/1923 | Harvey | 108/111 |
| 1,512,353 | 10/1924 | Marcus . | |
| 1,758,000 | 5/1930 | Herold . | |
| 2,130,245 | 9/1938 | Noelting | 16/29 X |
| 2,458,595 | 1/1949 | Herts | 5/282 |
| 3,255,722 | 6/1966 | Ferdinand et al. | 108/107 X |
| 3,639,942 | 2/1972 | Ostrom | 16/29 |
| 4,187,578 | 2/1980 | Little | 16/29 |

Primary Examiner—William E. Lyddane
Attorney, Agent, or Firm—Trexler, Bushnell & Fosse, Ltd.

[57] ABSTRACT

A dual purpose bracket is provided for cooperating with a corner post structure to join adjacent sides of a piece of furniture and to mount a caster-receiving socket. This dual purpose bracket comprises a single strip of substantially flat material formed to define a pair of substantially symmetrical joining portions and a socket-receiving portion intermediate and continuous with these joining portions. Each of the joining portions includes a portion locatable substantially coplanar with one of the adjacent sides to be joined and attachable to one adjacent side and to the corner post. The socket-receiving portion comprises a curved surface projecting inwardly with respect to an imaginary corner defined by the adjacent sides, the curvature thereof being similar to the curvature of at least a portion of the caster-receiving socket to receive the caster-receiving socket inwardly of the corner post.

10 Claims, 5 Drawing Figures

U.S. Patent Jul. 17, 1984 Sheet 1 of 2 4,459,920
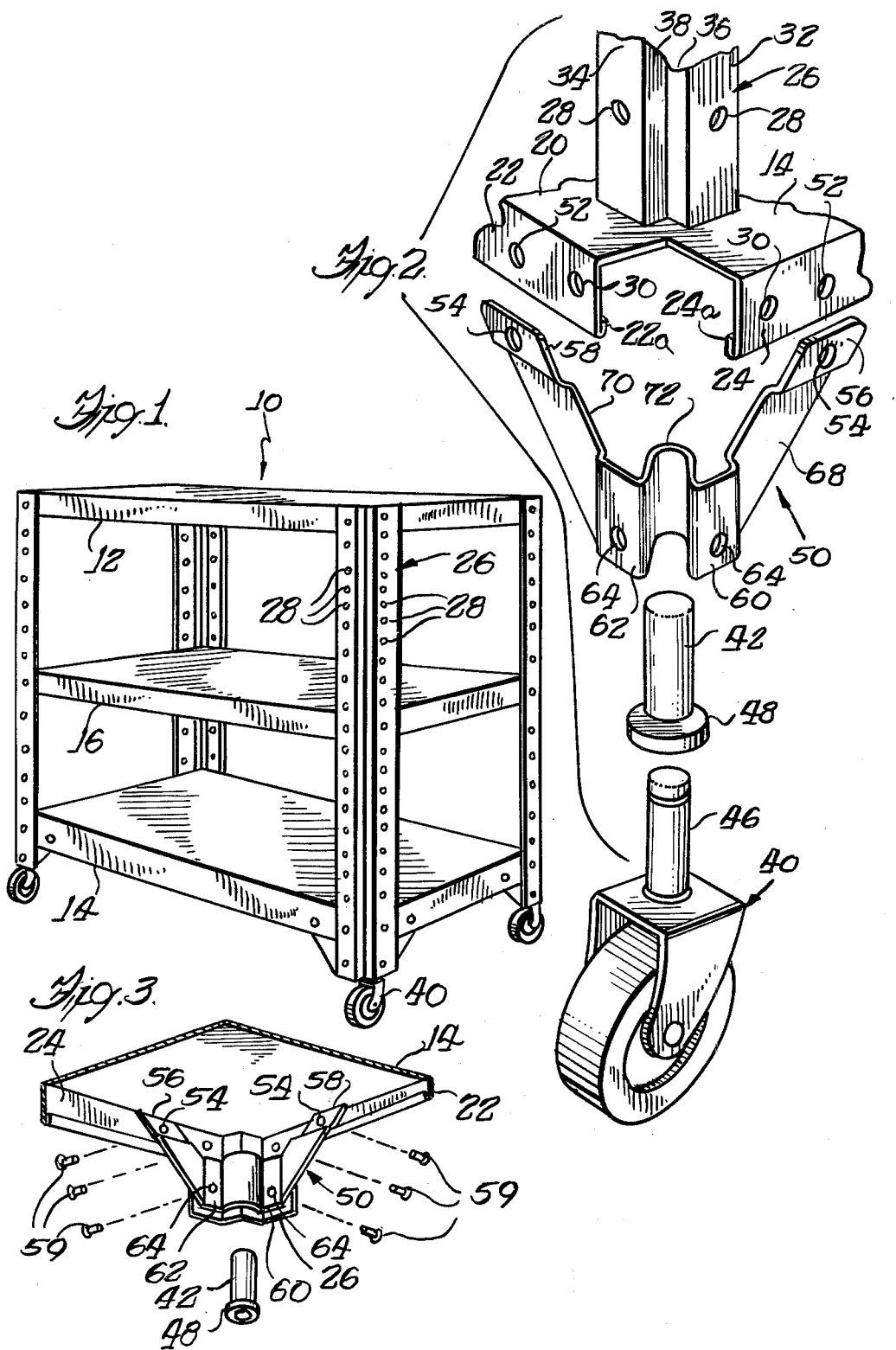

DUAL PURPOSE BRACKET

BACKGROUND OF THE INVENTION

This application is directed generally to brackets for use in furniture construction and more particularly to a dual purpose bracket for both affixing adjacent sides of a piece of furniture and for mounting generally therebetween a caster-receiving socket.

The present invention relates to an improved bracket of the foregoing type which is readily adapted to be fabricated from a single metal stamping. This caster bracket includes a caster socket mounting curved portion which lies intermediate and joins a pair of substantially symmetrical side members. Each of these side members includes surfaces located to be joined both with the adjacent surfaces of a piece of furniture and with adjacent surfaces of a corner post member which additionally joins the adjacent surfaces of the furniture.

The bracket of the present invention possesses both cost and strength advantages over prior art constructions of this type. From a cost standpoint, the angles and curvatures formed to define the socket-receiving portion and symmetrical furniture joining surfaces to either side thereof are relatively few and simple. These parts may all be formed by simple stamping and/or bending operations, without placing any appreciable stress or bending moments upon the sheet metal stamping. Additionally, the socket-receiving portion of the bracket is adapted to cooperate with a corner post structure both in joining the adjacent sides of the furniture assembly and in supporting the caster-receiving socket and caster received therein, thereby distributing the loads and forces applied by both these joining and supporting functions.

OBJECTS AND SUMMARY OF THE INVENTION

Accordingly, it is an object of the invention to provide a novel and improved bracket for joining adjacent sides of a piece of furniture and for mounting a caster-receiving socket.

A further object is to provide such a bracket which is relatively simple and inexpensive to construct and yet highly reliable in operation.

Briefly, and in accordance with the foregoing objects, a dual purpose bracket is provided for cooperating with a corner post structure to join adjacent sides of a piece of furniture and to mount a caster-receiving socket. This dual purpose bracket comprises a single strip of substantially flat material formed to define a pair of substantially symmetrical joining portions and a socket-receiving portion intermediate and continuous with these joining portions. Each of the joining portions includes surface means locatable substantially coplanar with one of the adjacent sides to be joined and including means for attachment to said one adjacent side and to said corner post. The socket-receiving portion comprises a curved surface projecting inwardly with respect to an imaginary corner defined by the adjacent sides, the curvature thereof being similar to the curvature of at least a portion of the caster-receiving socket to receive the caster-receiving socket inwardly of the corner post.

BRIEF DESCRIPTION OF THE DRAWINGS

Other objects, features and advantages of the invention will be more clearly appreciated upon reading the following detailed description of the illustrated embodiment, together with reference to the accompanying drawings wherein:

FIG. 1 is a perspective view of a furniture assembly with which the dual purpose bracket of the invention is particularly useful;

FIG. 2 is an exploded perspective view of a corner portion of the furniture assembly of FIG. 1 illustrating the assembly of the invention therewith;

FIG. 3 is a partially exploded, partially cut away perspective view taken from the inside of a corner of the furniture assembly of FIG. 1;

DETAILED DESCRIPTION OF THE ILLUSTRATED EMBODIMENT

Figure 4:
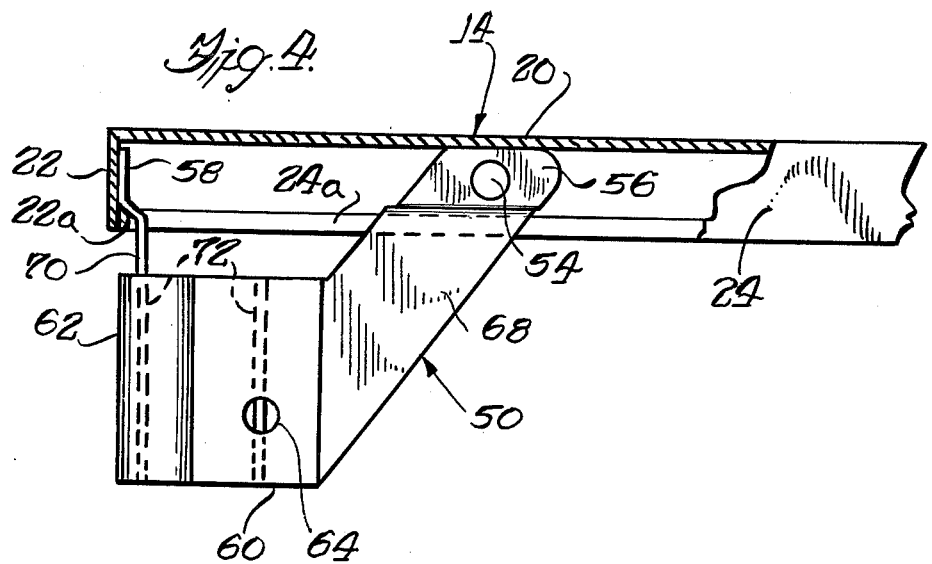
FIG. 4 is an enlarged side elevation, partially cut away, illustrating the assembly of the bracket of the invention with the furniture assembly of FIG. 1.

Referring now to the drawings and initially to FIG. 1, a furniture assembly with which the dual purpose bracket of the invention is particularly useful is designated generally by the reference numeral 10. This furniture assembly 10 includes at least an upper shelf or top panel 12 and a lower shelf or bottom panel 14. In the illustrated embodiment an additional, middle shelf 16 is also included. Each of these shelves 12, 14, 16 are substantially identical and in the illustrated embodiment comprise a substantially rectangular, pan-shaped sheet member, preferably of relatively thin, sheet metal material.

As best viewed in FIG. 2, the shelf 14, which is substantially identical to the shelves 12 and 16, includes a rectangular top surface 20 which has four downwardly depending side or lateral surfaces or skirts 22, 24. It will be noted that the corner portion of the shelf 14 is cut away to receive a corner post 26, which serves to locate the three shelves 12, 14 and 16 and hold them together in assembled condition, as seen in FIG. 1. Four such corner posts 26 are provided in the illustrated embodiment. As best viewed in FIG. 1, each of these corner posts 26 includes a plurality of apertures 28 for receiving screws of other suitable fasteners therethrough which may be aligned with similar apertures 30 at end parts of the depending skirts 22, 24 of each shelf, such as the shelf 14 as viewed in FIG. 2. These apertures 28 and 30 may be aligned to receive suitable fasteners (not shown) therethrough to locate the respective shelves 12, 14 and 16 relative to the corner posts 26.

It will be seen that each of these corner posts 26 is substantially W-shaped in cross-section and thus effectively fills in a portion of the cutaway corner part of each of the shelves 12, 14, 16. In this regard, the corner post 26 of FIG. 2 will be seen to include a pair of generally perpendicular outer wall portions 32, 34 which carry the apertures 28 and a pair of inner wall portions 36, 38 which are substantially perpendicular, respectively, with the outer wall portions 32, 36 and hence with each other. Accordingly, these latter interior wall portions 36, 38 extend into the cutaway corner portion of each of these shelves 12, 14 and 16.

The furniture or shelf assembly of FIG. 1 is provided with a suitable, conventional caster 40 at each of the bottom corners thereof. As seen in FIG. 2, this caster 40 is carried in a suitable socket member 42, preferably of a durable plastics material. This caster-receiving socket 42 generally includes an elongate, tubular portion 44 which receives a mounting shaft 46 of the caster 40 and an outwardly extending flange or skirt portion 48, which, as will be seen later, transmits the weight of the assembly 10 to the associated caster 40.

In accordance with the invention, a dual purpose bracket designated generally by the reference numeral 50 is provided. Advantageously this bracket 50 not only provides additional support to the corner post 26 in joining the adjacent sides of the bottom-most or lower shelf 14, but also provides a suitable mounting for receiving the socket 42 and hence for mounting the caster 40 to the assembly 10. As best viewed in FIG. 3, the dual purpose bracket 50 is mountable generally to the underside of the lower or bottom-most shelf 14, inside the depending flange or skirt portions 22, 24 thereof. To this end, a pair of additional apertures 52 are provided spaced outwardly from the apertures 30 in the depending flanges 22, 24. These apertures 52 are alignable with apertures 54 provided in a pair of upper mounting surfaces 56, 58 which form a part of the dual purpose bracket 50. Suitable fasteners 60 may be received through these aligned apertures 52, 54 for securing the bracket 50 to the back, underside of the shelf 14.

The bracket 50 includes a second pair of mounting surfaces 60, 62 having through apertures 64 for alignment with selected ones of the through apertures 28 of the associated corner post 26. These mounting surfaces 60, 62 will be seen to be generally coplanar with the associated mounting surfaces or portions 56, 58, respectively. Accordingly, the corner bracket 50 aids in promoting proper alignment and attachment of the corner post 26 relative to the shelf 14. It will be appreciated that the sheet material from which the corner post 26 and shelf 14 are constructed is relatively thin, whereby the described substantially coplanar location of the mounting surfaces 56 and 60 on the one hand and 58, 62 on the other hand promote proper alignment between the corner post 26 and shelf 14.

It will be noted that each of the downwardly depending skirts 22, 24 of the shelf 14 terminates in an internally projecting bent-over lip portion 22a, 24a. This is done primarily to strengthen the shelf and also to avoid relatively sharp edges at the exposed bottom-most edge of the shelf 14. In order to promote proper alignment of the dual purpose bracket 50, the generally coplanar mounting surfaces 56, 60 on the one side and 58, 62 on the other side are joined by substantially similar intermediate portions 68, 70 of the bracket 50. In order to maintain this alignment these intermediate portions 68, 70 are recessed inwardly somewhat from the respective, substantially coplanar mounting surfaces 56, 60 and 58, 62, so as to clear the inwardly extending peripheral lip or bentover portions 22a, 24a of the shelf 14. In order to properly locate a portion of the bracket 50 in a downwardly depending condition with respect to the shelf 14, for receiving the caster 40, these intermediate joining portions 68, 70 are angled downwardly and inwardly from the mounting surfaces 54, 56, to where they terminate in the mounting surfaces 60, 62.

Advantageously, the dual purpose bracket 50 is constructed from a single strip of flat, and preferably sheet material, for example, by relatively simple bending or stamping operations. The two mounting surfaces 60, 62 are thus joined by a socket-receiving portion 72 which takes the form of a semi-circular inwardly extending portion which is generally U-shaped in cross-section.

This socket-receiving portion 72 thus extends inwardly of the cutaway corner portion of the shelf 14 and also inwardly of the inwardly extending wall surfaces 36, 38 of the corner post member 26.

Figure 5:
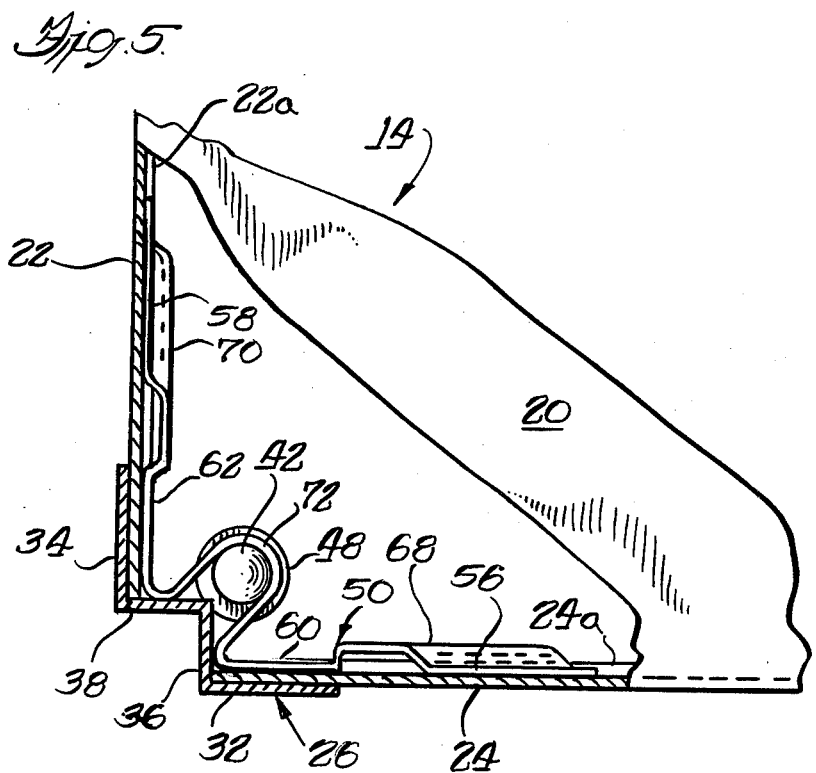
FIG. 5 is a top plan view, partially cut away, illustrating the assembly of the bracket of the invention with the furniture assembly of FIG. 1.

As best viewed in FIG. 5, the outwardly extending lip or flange portion 48 of the socket 42 thus abuts the lower edge of this socket-receiving portion 72. Moreover, it will be seen that the innermost parts of the wall portions 36, 38 of the corner post 26 cooperate with the socket-receiving portion 72 for supporting this lip 48 and hence the entire socket 42 and caster 40 received therein. Preferably, the inner dimension of the socket-receiving portion 72 is similar to the outer dimension of the socket 48, whereby the latter may be received or a press fit within the former.

Advantageously, the dual purpose bracket 50 thereby serves the purpose of both aiding in properly securing and aligning the corner post 26 with respect to the shelf 14 and in mounting and supporting the caster 40 by means of the socket 42. It will be seen that the weight of the assembly 10 is transmitted to the caster 40 by means of the abutment of the skirt 48 with the bracket portion 72 and corner post 26.

What has been shown and described herein is a novel dual purpose bracket for use in securing adjacent sidewalls of a furniture assembly and for mounting a caster. However, the invention is not limited to the specific embodiment described herein. Those skilled in the art may devise alternatives, changes or modifications upon reading the foregoing descriptions. The invention includes such alternatives, changes and modifications insofar as they fall within the spirit and scope of the appended claims.

The invention is claimed as follows:

1. A dual purpose bracket for cooperating with a combined corner post and leg structure, a post portion of which overlies adjacent sides of a piece of furniture and a leg portion of which extends below a lowermost surface of the piece of furniture, to join said adjacent sides of a piece of furniture and to mount a caster-receiving socket, and comprising: a single strip of substantially flat sheet material formed to define a pair of substantially symmetrical joining portions and a socket-receiving portion intermediate and continuous with said joining portions, each of said joining portions including a first surface locatable substantially abutting an inner surface of said corner post leg portion and having a through aperture for receiving fastener means for attachment to said corner post, a second surface locatable substantially abutting the plane of an inner surface of one of said adjacent sides and having a through aperture for receiving fastener means for attachment to said one adjacent side and a third surface recessed inwardly of said first and second surfaces and joining said first and second surfaces, said third surface permitting simultaneous attachment of said bracket with said adjacent sides and with said leg therebelow without interference from said sides, thereby providing a second point of securement of said corner post and leg structure to said furniture adjacent surfaces for enhanced rigidity of said leg portion for mounting said caster, and said socket-receiving portion comprising a curved surface projecting inwardly with respect to an imaginary corner defined by said adjacent sides, the curvature thereof being similar to the curvature of at least a portion of said caster-receiving socket to receive said caster-receiving socket inwardly of said corner post.

2. A bracket according to claim 1 wherein said curved socket-receiving surface is substantially U-shaped in cross-section for receiving said socket, said corner post including an inwardly extending part and said socket having a radially outwardly extending lip for support by both said U-shaped surface and at least a portion of said inwardly extending part of said corner post.

3. A bracket according to claim 1 or claim 2 wherein the inner dimension defined by said curved socket-receiving surface is substantially similar to the outer dimension of said caster-receiving socket for holding said socket substantially in a press fit therein.

4. A bracket according to claim 1 or claim 2 wherein each said intermediate surface extends at an angle upwardly and outwardly of its associated said first surface whereby the junctions thereof with its associated said first surface and said second surface are substantially at right angles, thereby defining the extension of each said first surface downwardly of the one adjacent side of said piece of furniture coupled with its associated said second surface.

5. A bracket according to claim 4 wherein each said second surface joins said bracket to one of adjacent, perpendicular sides of a pan-shaped shelf member having inwardly extending bottom lip portions, said inward recess of said intermediate portion thereby permitting abutment of said second surface with one of said sides of said pan-shaped shelf member and abutment of said first surface with the corner post member joining said adjacent sides of said pan-shaped shelf member.

6. A bracket according to claim 5 wherein each said first surface joins said pan-shaped shelf member laterally outwardly of the points thereof joined by said corner post member.

7. A shelf assembly comprising at least two substantially rectangular, pan-shaped shelf members joined at respective corners by elongate corner posts, each of said corner posts comprising an elongate member having a pair of substantially perpendicular sides for overlying and joining said shelf members, the corner portions of said shelf members being cut away and said corner post members each having a further, inwardly projecting perpendicular pair of sides projecting partially into the cutaway corners of said shelf members, a portion of said corner post extending below said shelf to define a leg, and a dual purpose bracket for further joining said corner post with adjacent, perpendicular lateral sides of a bottom-most said shelf members generally outwardly of the points of attachment of said corner post member therewith and for mounting a caster-receiving socket, said dual purpose bracket comprising a single strip of substantially flat sheet material formed to define a first pair of perpendicular surfaces mountable adjacent the shelf joining sides of said corner post member extending portion for attachment therewith, a curved surface recessed inwardly of and joining said first pair of surfaces and defining an open-ended enclosure for receiving said caster-receiving socket in cooperation with said inwardly projecting surfaces of said corner post member, a second pair of generally perpendicular surfaces alignable with interior surfaces of the adjacent, perpendicular sides of the bottom-most of said shelf members for attachment therewith and a pair of generally inwardly recessed surfaces each joining one of said first pair of surfaces with one of said second pair of surfaces so as to project said second pair of surfaces generally downwardly and inwardly of but in the substantially same plane as said first pair of surfaces for supporting said caster-receiving socket generally below the bottom-most portion of said bottom-most shelf member, without interference between said shelf member and said recessed surfaces of said bracket.

8. A bracket according to claim 7 wherein said curved socket-receiving surface is substantially U-shaped in cross-section for receiving said socket and said socket having a radially outwardly extending lip for support by both said U-shaped surface and at least a portion of said inwardly extending part of said corner post.

9. A bracket according to claim 7 or claim 8 wherein the dimension defined by said curved socket-receiving surface is substantially similar to the outer dimension of said caster-receiving socket for holding said socket substantially in a press fit therein.

10. A bracket according to claim 7 or claim 8 wherein each intermediate surface extends at an angle upwardly and outwardly of its associated said first surface whereby the junctions thereof with its associated said first surface and said second surface are substantially at right angles, thereby defining the extension of each said first surface downwardly of the one adjacent side of said piece of furniture coupled with its associated said second surface.

* * * * *